(No Model.)

M. S. HERSHEY.
CANDY HOLDER.

No. 412,090. Patented Oct. 1, 1889.

Witnesses,
And H. Herr.
A. M. Houser.

Inventor,
Milton S. Hershey
By his Attorney Wm. R. Gerhart

UNITED STATES PATENT OFFICE.

MILTON S. HERSHEY, OF LANCASTER, PENNSYLVANIA.

CANDY-HOLDER.

SPECIFICATION forming part of Letters Patent No. 412,090, dated October 1, 1889.

Application filed February 21, 1889. Serial No. 300,679. (No model.)

*To all whom it may concern:*

Be it known that I, MILTON S. HERSHEY, a citizen of the United States, residing in Lancaster, in the county of Lancaster and State of Pennsylvania, have invented certain Improvements in Candy-Holders, of which the following is a specification.

My invention relates to holders for candy, made of some pliable material, portions of which are turned upward to form the sides of the holder; and the objects of my improvements are, first, to use portions of the material from the bottom of the holder to form the sides, and, second, to construct the holders so that they can be used for toys after the candy is removed from them. I attain these objects by the device illustrated in the accompanying drawings, in which—

Figure 1:
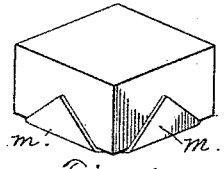
Figure 2:
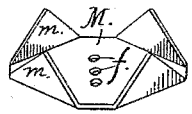
Figure 3:
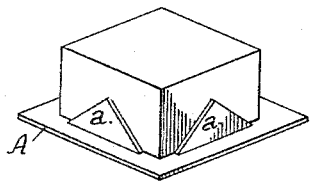
Figure 4:
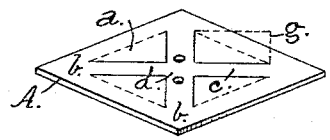
Figure 5:
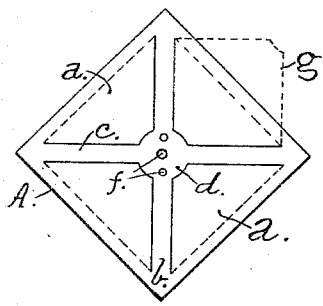
Figure 6:
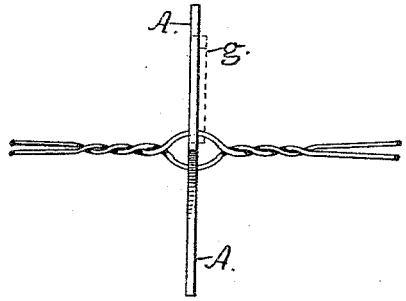
Figure 7:
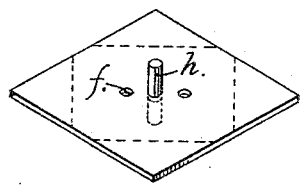

Figure 1 is a perspective view of one form of holder with a block of candy in it, and Fig. 2 a similar view of the same with the candy removed. Fig. 3 is a perspective view of a different and preferable form of the holder having a block of candy in place, and Figs. 4 and 5 are perspective views of two plates as they appear before the sides of the holders are formed. Fig. 6 is an edge view of a discarded holder turned into a "buzz-spinner," and Fig. 7 is a perspective view of a modified form of holder-plate constructed to form a top.

Similar letters indicate like parts throughout the several views.

The holder for each block of candy is made separate from the others, so that they can be sold with the candy, no matter how small a number of blocks are disposed of at a time.

These holders are made from small plates of any suitable pliable material, though I find that plates cut from light sheet-tin seem to be the cheapest and most easily handled.

In the construction I prefer to use, Figs. 3, 4, and 5, a plate A of the required size has triangular sections $a$ cut in it, the apex of each section pointing toward the center. Each triangle has a side of the plate as a base, and it is there not separated from the plate, and the bases are left connected with each other, as shown at $b$. These triangles are also so cut as to leave partitions $c$ between them, which intersect at the center $d$ of the plate. It will thus be understood that the triangles are only separated from the original plate upon two sides, as shown in the three figures mentioned. After the triangles are cut out they are bent outward and upward until they stand at right angles with the original plate, forming sides for the holder, as seen in Fig. 3, the partitions $c$ forming the bottom support for the block of candy. At their intersection the partitions have apertures punctured through them at two or three places, as seen at $f$. After the candy is used the triangular sides are bent downward and outward, as shown by the dotted lines at $g$, Figs. 4 and 5. When this is done, a string is passed through the two outside punctures $f$, and there is thus formed a buzz or "saw" spinner, so popular among children, (illustrated in Fig. 6,) or a pin $h$ is inserted in the center aperture, so as to form a top. (Shown in Fig. 7.)

Figs. 1 and 2 show a plate M, in which the corners $m$ are turned upward to form the holder, the bottom being continuous. In this case it will readily be seen there is much more material used than in the holder shown in the other figures; but the discarded holder can be used as a toy in the same way.

Having thus described my invention, what I claim as new, and desire to secure by Letters Patent, is—

1. A candy-holder made from a single plate having portions of the material in the center cut out, said cut-out portions projecting upward and forming the sides of the holder, and other portions located between said sides extending inward and forming the bottom, substantially as specified.

2. A candy-holder made from a single plate having openings cut through it, the portions of the material cut from the openings projecting upward and forming the sides of the holder, and other portions extending across the holder between the openings and forming the bottom thereof, substantially as specified.

MILTON S. HERSHEY.

Witnesses:
JACOB HALBACH,
WM. R. GERHART.